Nov. 18, 1941.            E. W. ALLEN            2,263,063

BAGGAGE RACK HEAD CUSHION

Filed Dec. 12, 1940

Inventor
Everett W. Allen
By Blackmore, Spencer & Flint
Attorneys

Patented Nov. 18, 1941

2,263,063

UNITED STATES PATENT OFFICE 2,263,063

BAGGAGE RACK HEAD CUSHION

Everett W. Allen, Birmingham, Mich., assignor to Yellow Truck & Coach Manufacturing Company, Pontiac, Mich., a corporation of Maine Application December 12, 1940, Serial No. 369,833

6 Claims. (Cl. 45—137)

This invention relates to an improved cushion structure for the edge of an overhead parcel rack in passenger coaches.

An object of the invention is to provide a simple and inexpensive luggage shelf facing to protect a passenger who accidentally bumps against the rack and which is of such shape and design as to improve coach interior appearance.

A further object is to provide a cushion which can be applied and serviced easily and in which the fastening attachments are normally concealed but readily accessible.

Another object is to provide a cushion consisting essentially of a molded or extruded rubber facing which can be manufactured and supplied in long strips and cut off in proper lengths to fit particular installations and in its preferred embodiment having a cross section resembling the letter B with the vertical riser constituting the attachment base and the upper and lower loops being formed by a pair of curved lips integral with and projected outwardly from upper and lower edges of the base and toward one another for cooperating abutment at their free edge portions in forming axially split hollow tube-like structures. The walls of the longitudinally extending tubes being elastic they will yield to blows and air trapped within the tubes will further cushion the impact. By reason of their connection with the base and their abutment with one another the hollow loops will cooperate in resisting deflection and by arranging the inturned free edges of the loops to bottom on the base a variable rate deflection is obtained for the initially soft cushion.

Figure 1:
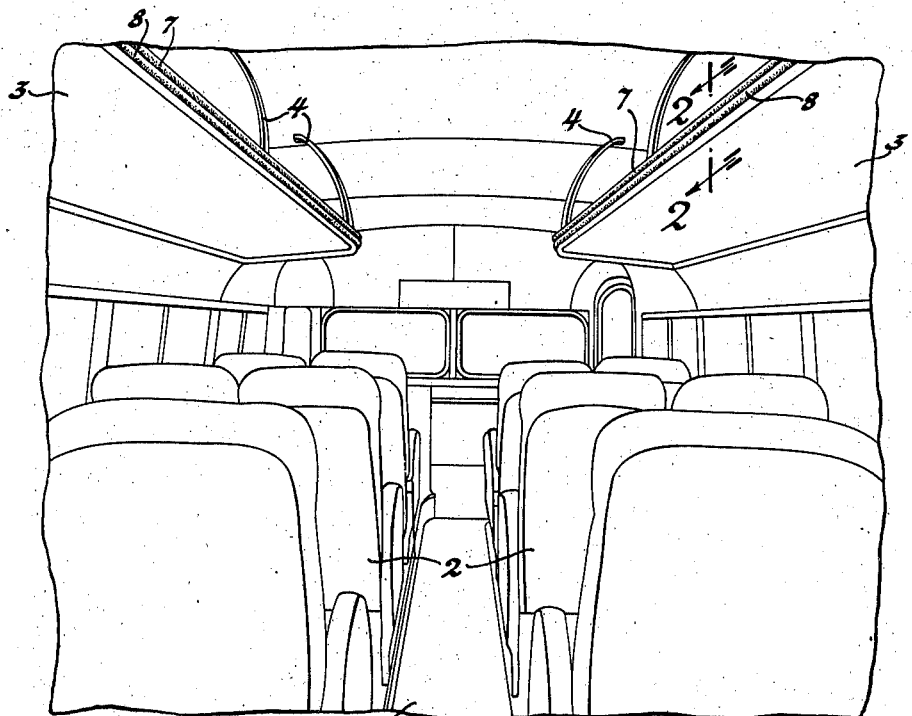
Figure 2:
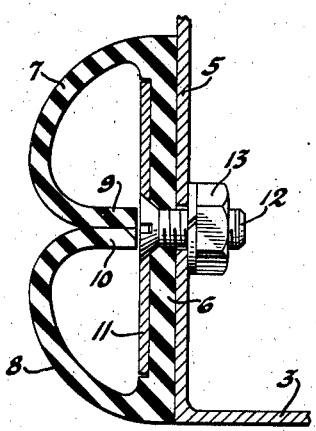
Figure 3:
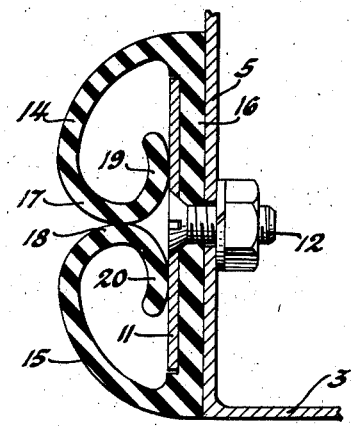

For a better explanation of the invention reference will be made to the accompanying drawing wherein Figure 1 is a perspective view of the interior of a passenger coach looking forward and Figures 2 and 3 are detail sectional views showing alternative forms of the cushion, each view being taken as on line 2—2 of Figure 1.

Passenger coaches as ordinarily constructed have a central passenger aisle 1 and two rows of passenger seats 2 on opposite sides of the aisle. Above the passenger seats are overhead parcel racks 3 projecting inwardly from and being supported by the coach side walls. In some instances additional support may be provided by suspension bars 4 dependent from the roof and connected with the inner edge of the parcel rack. With this arrangement ample head room is afforded for seated passengers as well as any passengers in the aisle.

A passenger rising from a seat or moving in the aisle may accidentally bump his head or other part of his body against the rack or may be thrown against the rack by a sudden lurch of the vehicle and in order to reduce the likelihood of injury it is proposed to use a soft covering or facing conveniently mounted on the upstanding parcel retaining flange 5 along the aisle edge of the rack 3. According to the present invention the facing consists of a strip of soft rubber, preferably formed by a well known extrusion process in long lengths and subsequently cut off to the desired size. As illustrated, the strip in section includes an attachment base portion 6 and a pair of curved lips 7 and 8 projecting outwardly from the top and bottom of the base 6 and extending toward one another with inturned portions 9 and 10 at the free edges of the lips. In the case of Figure 2 the inturned portions 9 and 10 are in abutment with one another and constitute straight columns whose terminal or edge faces are spaced slightly from the surface of the base 6 at a region intermediate its top and bottom.

The base 6 is clamped against the parcel retaining ledge 5 by a metal stiffening plate 11 which may be continuous throughout the length of the base or may be formed in sections. It is contained within the hollow tube space and can be introduced either through the open end of the strip or between the spread apart lips 7 and 8. For a unitary assembly and to facilitate handling, the fastening strip 11 if desired can be vulcanized or cemented to the rubber base 6. In any event the attachment plate 11 forms a bearing for the heads of a number of fastening studs, one of which is shown at 12 passing through the shelf flange 5 and having a nut 13 threaded thereon. In the application and removal of the facing a screwdriver or other suitable tool may be inserted between the abutting free edge portions 9 and 10 of the lips into engagement with the head of the fastening stud.

As will be evident the assembly provides a hollow air containing cushion in which the elastic lips may be deflected to cushion blows and prevent injury. In such deflection the two tubular elements cooperate with one another by reason of the abutting portions 9 and 10 and which portions after an initial deflection bottom on the base 6 through the intervening attachment plate 11 for increasing resistance to further deflection.

For a still softer cushioning action the rubber facing may be shaped as shown in Figure 3 wherein the tube forming lips 14 and 15 carried by the attachment base 16 have their free ends curved inwardly at 17 and 18 for abutment with one another and then project away from one another as at 19 and 20 affording curved bearing tips adjacent the free edges of the lips for engagement with the base 16 so as to eliminate the stiff column effect present in the alternative structure of Figure 2. Here again a stiffening plate 11 and fastening stud 12 secure the rubber facing to the shelf ledge 5.

In both illustrated embodiments the cushion consists of a long strip having a flat attachment base and a pair of lips integral therewith and of substantially semi-cylindrical or C-shape in cross section extending outwardly from the base and abutting one another to form a pair of longitudinally extending air enclosing tubes, which not only protect the passengers from injury but also give a decorative effect to the interior of the vehicle. Harmony or contrast with the coach decorative scheme is obtained by using rubber of preselected coloring. The use of soft rubber of inexpensive quality is contemplated.

I claim:

1. In a baggage rack head cushion of the character described, a facing strip of rubber, a stiffener plate associated with said rubber strip, attachment studs passing through the plate and strip, and a pair of outwardly bowed rubber lips integral with said strip and projecting from the top and bottom edges thereof and curving outwardly away from the stiffener plate and then inwardly with end portions adjacent the free edges of the lips in abutment with one another for their mutual reinforcement and separable to allow access to said attachment stud, said lips together constituting a pair of hollow tubular cushions.

2. In a head cushion, an attachment base, a plurality of elastic rubber-like flaps projecting outwardly from the base in arched relation thereto, at least one of the arched flaps having a portion adjacent its free edge turned toward and abutted against a portion of its neighboring flap to afford an axially split hollow tube.

3. A molded head cushion comprising a longitudinal strip of rubber-like material extruded to a cross section of substantially B-shape, with the vertical riser constituting an attachment base, and the two loops being in the form of free flaps abutting one another in concealing relation to the base and affording a pair of longitudinally split elastic hollow tubes and each being integral with the base along one longitudinal edge and unattached at its opposite longitudinal edge.

4. A cushion facing for a coach luggage rack or the like, including a rubber member having a flat attachment base and a pair of hollow tubes on the face of the base, a base stiffener plate enclosed by said tubes, each tube comprising a lip integral with the base and of substantially semi-cylindrical section with its free edge terminating in an abutment column engaged by the corresponding portion of the companion lip and the free edges of both lips bottoming on said plate.

5. A cushion facing for a coach luggage rack or the like, including a rubber member having a flat attachment base and a pair of hollow tubes on the face of the base, a base stiffener plate enclosed by said tubes, each tube comprising a lip integral with the base and of curved cross section, said lips extending outwardly from the base and toward one another with inturned portions in abutment and terminating in backwardly turned tip portions projecting away from one another and engaging said plate.

6. A head protecting cushion of the character described, comprising a molded rubber-like member having a base with a pair of hollow tube-like facings overlying the base in side by side relation and including arched flaps projected outwardly away from the base and turned inwardly toward the base at the free tip portions for bearing abutment on each other, a base stiffener overlaid by both facings and mounting members associated with the stiffener and accessible by spreading said flaps apart.

EVERETT W. ALLEN